United States Patent [19]

Haraguchi et al.

[11] Patent Number: 5,280,061

[45] Date of Patent: Jan. 18, 1994

[54] SPRAYABLE ADHESIVE COMPOSITION

[75] Inventors: Nobuyasu Haraguchi, Ohotsu; Takao Kihara, Takatsuki, both of Japan

[73] Assignee: Sekisui Kagaku Kogyo Kabushiki Kaisha, Osaka, Japan

[21] Appl. No.: 755,390

[22] Filed: Sep. 5, 1991

[30] Foreign Application Priority Data

Sep. 7, 1990 [JP] Japan ................................. 2-237734

[51] Int. Cl.⁵ ................................................ C08K 5/01
[52] U.S. Cl. .................................... 524/390; 524/364
[58] Field of Search ...................... 524/364, 389, 390

[56] References Cited

U.S. PATENT DOCUMENTS

| | | |
|---|---|---|
| 3,445,566 | 5/1969 | Skoultchi et al. ............... 524/390 |
| 3,691,140 | 9/1972 | Silver . | 
| 3,857,731 | 12/1974 | Merrill et al. .................. 428/354 |
| 4,059,688 | 11/1977 | Rosenberg et al. ............. 524/389 |
| 4,166,152 | 8/1979 | Baker et al. . |
| 4,265,797 | 5/1981 | Suk ................................. 524/389 |
| 4,735,837 | 4/1988 | Miyasaka et al. .............. 428/325 |
| 4,994,322 | 2/1991 | Delgado et al. ................ 524/801 |

*Primary Examiner*—Paul R. Michl
*Assistant Examiner*—Andrew Merriam
*Attorney, Agent, or Firm*—Armstrong, Westerman, Hattori, McLeland & Naughton

[57] ABSTRACT

A sprayable adhesive composition superior in removability from a surface of paper and making it difficult to cause an adhesive transfer phenomenon to a surface to be affixed, which is constructed by dispersing adhesive microspheres having an average particle diameter of 10 to 100 μm obtained by subjecting a composition containing a (meth)acrylate, a water-soluble monomer copolymerizable with the (meth)acrylate, and an oil-soluble polyfunctional monomer having two or more polyumerizalbe unsaturated groups in a molecule to aqueous suspension copolymerization under the presence of an oil-soluble polymerization initiator and a surface-active agent in an aerosol-dispersion medium containing a first solvent for maintaining dispersion properties of the adhesive microspheres so as to exhibit sprayable properties, a second solvent for restraining the swelling of the adhesive microspheres, and an aerosol propellant.

10 Claims, 1 Drawing Sheet

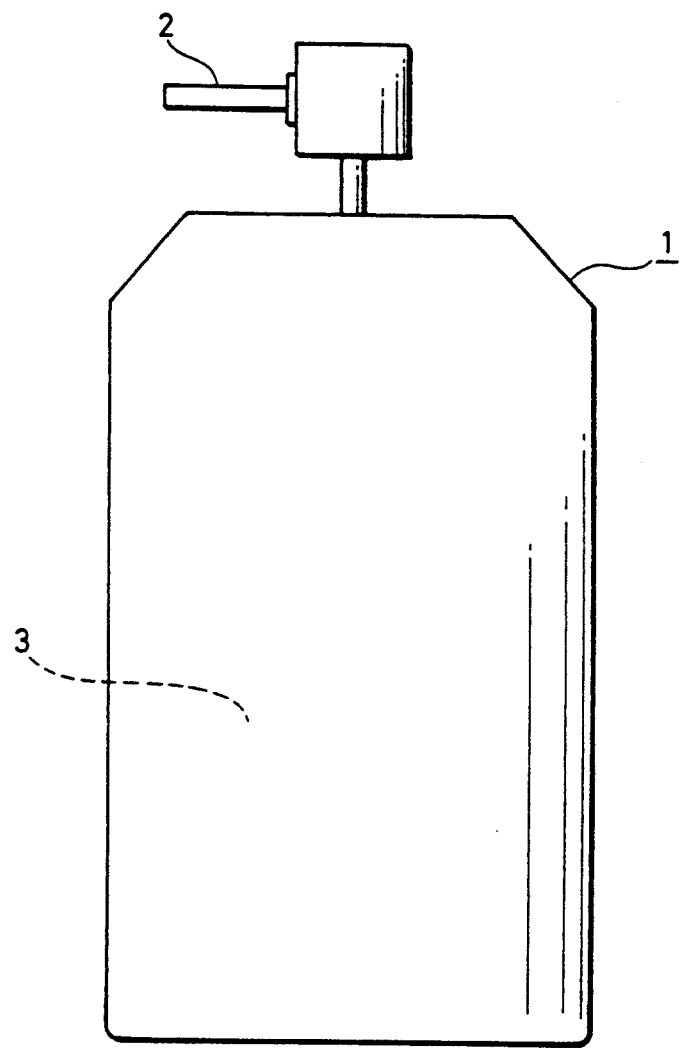

SPRAYABLE ADHESIVE COMPOSITION

BACKGROUND OF THE INVENTION

1. Field of the Invention

The present invention relates generally to sprayable adhesive compositions used as spray-type adhesives, and more particularly, to a sprayable adhesive composition making it possible to repeatedly affix and strip a surface coated with the adhesive composition to and from a surface to be affixed and making it difficult to cause adhesive transfer of the adhesive composition to the surface to be affixed when the above surface coated with the adhesive composition is stripped from the surface to be affixed.

Conventionally, various spray-type adhesives have been commercially available. Furthermore, in recent years, spray-type adhesives having adhesive properties which allow affixing and stripping to and from a surface of paper many times have been commercially available.

One example of adhesive compositions usable as the above described spray-type adhesives is disclosed in British Patent No. 1,250,261. The specification discloses a sprayable adhesive composition constructed by dispersing in a suitable organic solvent and aerosol propellant an adhesive substance composed of a copolymer, which contains a (meth)acrylic ester and a monomer copolymerizable with the (meth)acrylic ester and is crosslinked by a crosslinker.

Furthermore, another example of adhesive compositions usable as the spray-type adhesives is disclosed in U.S. Pat. No. 453,825. The specification discloses a spray-type adhesive using an elastomer composed of a butadienacrylonitrile copolymer.

In any of the above described conventional sprayable adhesive compositions, a bulk-shaped copolymer and an elastomeric polymer are crushed into particles, the adhesive particles obtained are caused to swell by a solvent, and an aerosol container is filled with the adhesive particles along with an aerosol propellant.

In spray-type adhesive superior in adhesive properties to a surface of paper out of the conventional spray-type adhesives, however, when a substrate coated with the adhesive is affixed to a surface of paper, the surface of paper to which the substrate is affixed may, in many cases, be torn off in the case of stripping. That is, the adhesive power of the adhesive is high, so that the surface of paper to which the substrate is affixed may, in many cases, be damaged.

On the other hand, an adhesive composition containing adhesive microspheres exhibiting superior removability has been proposed in recent years as a removable adhesive composition (for example, Japanese Patent Laid-Open Gazette No. 260973/1988). However, the microspherical adhesives which have conventionally existed are ones, which are used for coating a substrate, such as "Post-it note pad" (trade name) manufactured by Minesota Mining and Manufacturing Company in the United States. No microspherical adhesives used as a sprayable adhesive composition have existed yet.

SUMMARY OF THE INVENTION

Accordingly, an object of the present invention is to provide a new sprayable adhesive composition which exhibits suitable adhesive power to a surface of paper which is a surface to be affixed, eliminates the necessity of tearing off the surface of paper in the case of stripping, is superior in sprayable properties in the form of aerosol, and makes it difficult to cause an "adhesive transfer" phenomenon to the surface of paper.

As a result of zealously studying sprayable adhesive compositions capable of achieving the above described object, the present inventors et al. have found that the above described object can be achieved by dispersing in an aerosol dispersion medium the adhesive microspheres, to make the present invention.

More specifically, the sprayable adhesive composition according to the present invention is characterized by being constructed by dispersing in an aerosol-dispersion medium adhesive microspheres having an average particle diameter of 10 to 100 $\mu$m, which are obtained by preparing a composition containing a (meth)acrylate, a water-soluble monomer copolymerizable with the (meth)acrylate and an oil-soluble polyfunctional monomer having not less than two polymerizable unsaturated groups in a molecule and subjecting the composition to aqueous suspension polymerization under the presence of an oil-soluble polymerization initiator and a surface-active agent.

It will be noted that the term (meth)acrylate means methacrylate or acrylate and the term (meth) will be used hereafter to indicate the same meaning.

The aerosol-dispersion medium contains a first solvent for maintaining sprayable properties, a second solvent for restraining the swelling of the above described adhesive microspheres, and an aerosol propellant.

Preferably, the aerosol-dispersion medium further contains nitrocellulose as described later, thereby to effectively restrain an adhesive transfer phenomenon to the surface to be affixed and achieve better removability of adhesive.

Furthermore, the sprayable adhesive composition according to the present invention is obtained through the steps of obtaining adhesive microspheres in the above described manner and dispersing the adhesive microspheres in an aerosol-dispersion medium.

Description is now made of the details of the sprayable adhesive composition according to the present invention.

Adhesive Microspheres

The sprayable adhesive composition according to the present invention contains as a main component adhesive microspheres superior in removability from a surface of paper, thereby to enhance the removability and to make it difficult to cause an adhesive transfer phenomenon to a surface to be affixed.

As the adhesive microspheres used in the present invention, it is possible to use adhesive microspheres disclosed in Japanese Patent Laid-Open Gazette No. 260973/1988, U.S. Pat. Nos. 3,691,140 and 4,166,152. The composition and the process of the adhesive microspheres disclosed in U.S. Pat. No. 3,691,140 and 4,166,152 shall be herein incorporated by reference. Description is now made of the process of the adhesive microspheres disclosed in Japanese Patent Laid-Open Gazette No. 260973/1988.

In the process disclosed in Japanese Patent Laid-Open Gazette No. 260973/1988, the adhesive microspheres are obtained by preparing a composition containing a (meth)acrylate, a water-soluble monomer copolymerizable with the (meth)acrylate, and an oil-soluble polyfunctional monomer having two or more polymerizable unsaturated groups in a molecule and subjecting the composition to aqueous suspension polymerization under the presence of an oil-soluble polymerization initiator and a surface-active agent.

More specifically, partial crosslinking progresses at the time of the above described aqueous suspension polymerization, to obtain an aqueous suspension containing microspherical polymers thus partially crosslinked.

Then, in order to lose the effect of the surface-active agent enveloping the microspherical polymers, acetone or alcohol is added to the above described aqueous suspension and then, the suspension is left after agitation, thereby to separate the microspherical polymers from a water system to rise to the liquid-surface. The microspherical polymers which rose to the liquid-surface are washed and dehydrated, thereby to obtain bulk bodies of the microspherical polymers having an average particle diameter of 10 to 100 $\mu$m.

Meanwhile, the reason why the upper limit of the average particle diameter of the microspherical polymers is set to 100 $\mu$m is that sprayable properties are lowered if it exceeds 100 $\mu$m. On the other hand, the reason why the lower limit thereof is 10 $\mu$m is that the microspherical polymers are embedded in a depression or concave portion of the surface of paper if it is less than 10 $\mu$m so that the effect as a removable adhesive surface is not sufficiently produced.

The above described microspherical polymers, that is, the adhesive microspheres are mainly composed of a (meth)acrylate ester/(meth)acrylic acid generally used for acrylic adhesives as a composition. In order to enhance removability, a high degree of crosslinking of the adhesive microspheres is required, whereby it is possible to restrain swelling due to a solvent for dispersing bulk bodies of microspheres and exhibiting sprayable properties, sprayable properties are enhanced, and superior removability is obtained. In order to maintain the high degree of crosslinking and high adhesive properties, at least 70% of an acrylic ester monomer used in preparing the above described microspherical polymers is preferably a 2-ethylhexyl acrylate.

Aerosol-dispersion medium

The bulk body of adhesive microspheres dehydrated is a highly crosslinked polymer. The highly crosslinked polymer exhibits high adhesive properties. Accordingly, in order to disperse the microspheres again for use as spray-type adhesive, it is necessary to use a solvent system allowing some degree of swell characteristics; otherwise, the microspheres would not be dispersed uniformly and for a short time by agitation.

In the present invention, therefore, an aerosol-dispersion medium contains a first solvent for exhibiting sprayable properties such as evaporation properties and dispersion properties, a second solvent for controlling the degree of swelling and the dispersion properties of the adhesive microspheres, and a propellant for spraying the dispersion medium as aerosol. The solvents and the propellant are required to have mutual solubility or stable dispersion properties under sprayable pressure.

As the first solvent for exhibiting sprayable properties, n-hexane, 1,1,1-trichloroethane and the like have been known. The latter is particularly superior in incombustibility.

When the above described bulk bodies of adhesive microspheres are dispersed using a dispersion medium containing only the above described first solvent and the propellant, each of the microspheres significantly swells, thereby to make it impossible to obtain a good sprayed state. In the present invention, therefore, the second solvent high in a swelling restraining force of the microsphere is added.

As the second solvent, ones high in large swelling restraining force, methanol, ethanol, isopropanol, acetone, n-propanol, methyl ethyl ketone and the like are listed. Among them, an alcohol group is most preferable from the conditions of mutual solubility of the above first solvent and the propellant; sprayable properties in a mixed system; the evaporation rate; and suitable permeability to an object to be coated, particularly, the nature of not easily dissolving a printed portion of the object to be coated. However, a mixed solvent of the alcohol group, acetone and the like can be also used.

As the propellant, fluorochlorohydrocarbons; a mixed system of propane and butane (liquefied natural gas); dimethyl ether and the like have been generally used. However, the mixed system of propane and butane, dimethyl ether, and the like are preferably used from the point of view of introducing no environmental problems. Furthermore, in the sprayable adhesive composition according to the present invention, dimethyl ether is preferably used from the point of view of mutual solubility and sufficient fluidity to a mixed solution of the first and second solvents.

Mixture ratio in aerosol-dispersion medium

In constructing the above described dispersion medium for aerosol, a mixture ratio of the first and second solvents and a solid-liquid mixture ratio of the first and second solvents with microspheres are first determined. Finally, the percentage of the propellant is determined from the relation of spray pressure. In an aerosol can, spray pressure of not less than 1.5 kg/cm$^2$ is generally required. The upper limit is the legal limit (7 kg/cm$^2$ at 45° C.) in Japan of aerosol internal pressure and preferably, in the range of 1.5 kg/cm$^2$ to 4.0 kg/cm$^2$.

The bulk bodies of adhesive microspheres are separated into individual microspheres by the first solvent. However, each of the microspheres swells by the first solvent. When the amount of increase in volume of the microsphere exceeds approximately 50% of the original size, fluidity and sprayable properties are degraded, and the microspheres tend not to exhibit a preferred scattered state. Accordingly, the swelling of the microsphere must be restrained to approximately 50% or less in volume. Therefore, the mixture ratio of the first solvent with the second solvent for restraining the swelling of the microsphere and exhibiting sprayable properties is preferably 80 to 50% by weight of the first solvent; 50 to 20% by weight of the second solvent. Consequently, the degree of swelling of the dispersed microsphere can be restrained to approximately 50% or less in volume.

On the other hand, in view of the ratio of the amount of a solid, namely, adhesive microspheres with the amount of the dispersion medium, as the viscosity of the spray-type adhesive is higher, that is, the amount of the dispersion medium is decreased while the amount of the solid is increased, drying of the spray-type adhesive after spraying is accelerated but the sprayable properties thereof is degraded. Contrary to this, as the amount of the dispersion medium is increased while the amount of the solid is decreased, the viscosity of the spray-type adhesive is lower to improve the sprayable properties thereof but drying of the spray-type adhesive after spraying is retarded. In order to obtain proper sprayable properties while maintaining desired adhesive power, the weight of the solid is generally 5 to 20% and preferably 10 to 15% of the entire dispersion medium.

Nitrocellulose

In the present invention, nitrocellulose or denaturated nitrocellulose such as partially amide-denaturated nitrocellulose is preferably added to the sprayable adhesive composition. Nitrocellulose is added so as to prevent a so-called adhesive transfer phenomenon more effectively. More specifically, strong adhesive properties to a surface of a substrate spray-coated with the adhesive composition according to the present invention and particularly, a surface of paper are given by adding nitrocellulose. As a result, the dried surface of paper coated with the adhesive can be repeatedly affixed and stripped. In addition, even if the surface of paper to be coated with the adhesive is stripped after being affixed for a long time, the possibility is eliminated that a part of the adhesive remains on a surface to be affixed and makes the surface to be affixed dirty.

At the present, removable adhesive paper by use of microspherical adhesives such as "Post-it note pad" (trade name) manufactured by Minesota Mining and Manufacturing Company in the United States of America is constructed by painting microspherical adhesive to a surface of paper. In this case, a primer is previously applied to the paper, to enhance adhesive properties of the microspheres to the paper. However, in the spray-type adhesives, it is practically impossible to previously apply such a primer to an unspecified object to be applied.

As a result of examining additives allowing the adhesive effect (anchor effect) to a surface to be affixed to be given by paying attention to this point, the inventors et al. have found that the above described nitrocellulose or denaturated nitrocellulose is most suitable.

Nitrocellulose or denaturated nitrocellulose is added to the sprayable adhesive composition, thereby to enhance adhesive properties to a surface of paper to be coated as well as to effectively prevent a so-called adhesive transfer phenomenon. Nitrocellulose or denaturated nitrocellulose can be added in the form of a solution containing nitrocellulose or denaturated nitrocellulose dissolved in an organic solvent, which exhibits solubility in the above described dispersion medium for aerosol, such as ethyl acetate, toluene, methyl ethyl ketone or MIBK. When the amount of addition of nitrocellulose or denaturated nitrocellulose is small, the adhesive effect to the surface of paper is not sufficiently obtained. On the other hand, when the amount of addition of nitrocellulose or denaturated nitrocellulose is excessive, the adhesive properties are degraded. Consequently, it is desirable to add nitrocellulose or denaturated nitrocellulose in the range of not more than 15 parts by weight and preferably, 2 to 10 parts by weight as a solid content per 100 parts by weight of the microspheres.

As described in the foregoing, the present invention provides the sprayable adhesive composition superior in removability because it uses the above described particular adhesive microspheres superior in removability.

Furthermore, in the sprayable adhesive composition according to the present invention, when nitrocellulose or denaturated nitrocellulose is added, adhesive properties to a surface of paper is enhanced to enhance the above described removability, and adhesive transfer to the surface of paper to be affixed which is referred to as a so-called adhesive transfer phenomenon is effectively solved.

Additionally, a good sprayed state is achieved by adding the second solvent capable of restraining the swelling of the adhesive microspheres in addition to the first solvent for exhibiting sprayable properties and the propellant as an aerosol-dispersion medium, thereby to provide an adhesive composition most suitable for spray-type adhesive.

The sprayable adhesive composition according to the present invention can be suitably utilized as spray paste for, for example, back gluing of a mask for an airbrush in addition to application in design work and preparation of a block copy and temporary application of a panel and a poster.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic side view showing an aerosol can containing a sprayable adhesive composition according to the present invention.

DESCRIPTION OF THE PREFERRED EMBODIMENTS

The present invention will be made clear by describing non-limited examples.

EXAMPLE 1

An aqueous suspension is prepared by mixing 291 g of 2-ethylhexyl acrylate, 9 g of acrylic acid, 0.09 g of divinylbenzene, 0.9 g of benzoyl peroxide, 1000 g of pure water, 6.66 g of sodium dodecyl benzenesulfonate serving as a surface-active agent, and 5.4 g of sodium hydroxide for controlling pH values and the suspension is agitated at 40° C. to make the diameters of monomer droplets equal, i.e., approximately 30 $\mu$m. Then, the suspension is raised to a temperature of 75° C. to be subjected to aqueous suspension polymerization for five hours in an atmosphere of nitrogen gas.

Then, in order to lose the effect of the surface-active agent, 25% by weight of acetone is added to the aqueous suspension obtained, and the mixture obtained is agitated and left, thereby to raise microspherical polymers to the liquid-surface and to separate the microspherical polymers from the aqueous suspension. Thereafter, the microspherical polymers are repeatedly washed using a centrifugal separator, to be dehydrated. The microspherical polymers are dehydrated until the water content is not more than 15% by weight. After the dehydration, the microspherical polymers are taken out as bulk bodies. The microspherical polymers are preferably dehydrated until the water content is not more than 5%.

1 g of the bulk bodies obtained in the above described manner are put into 100 ml of MIBK and dispersed for 1.5 hours using a shaker and then, the dispersion system is poured into a measuring cylinder to the scale of 100 ml. If the height of the bulk bodies settled and separated after being left for 3 hours is around the scale of 17 to 21 ml, the bulk bodies shall be accepted.

The bulk bodies of microspherical polymers obtained in the above described manner are dispersed again in an aerosol-dispersion medium having the following composition by agitation.

First, 15 parts by weight of the microspherical polymers are dispersed by agitation in a mixed solvent of 60 parts by weight of 1,1,1-trichloroethane serving as a first solvent for exhibiting sprayable properties and 20 parts by weight of ethanol serving as a second solvent for restraining the degree of swelling of the microspherical polymers, to obtain a disperse system. The aerosol can shown in FIG. 1 is filled with this disperse system, and 50 parts by weight of dimethyl ether serving as a propellant is injected into the aerosol can.

In FIG. 1, reference numeral 1 denotes an aerosol can, reference numeral 2 denotes a nozzle, and reference numeral 3 schematically indicates the position of an adhesive composition contained in the aerosol can.

In this case, the internal pressure of the aerosol can is 2.5 kg/cm$^2$ and it is found that the sprayable properties are good. When the adhesive composition according to the present invention is sprayed on a paper sheet arranged perpendicularly in a position spaced 20 cm apart from the aerosol can, the adhesive composition is uniformly applied to the paper sheet. After the adhesive composition applied is dried, when the paper sheet coated with the adhesive composition is affixed to wood free paper, the paper sheet coated with the adhesive composition is not stripped from and does not come off the wood free paper. In addition, when the paper sheet coated with the adhesive is affixed and stripped repeatedly several times, and adhesive transfer phenomenon is observed to such an extent that a surface of the wood free paper is slightly sticky.

EXAMPLE 2

15 parts by weight of the microspherical polymers prepared in the Example 1 are dispersed in a mixed solvent containing 60 parts by weight of 1,1,1-trichloroethane, 15 parts by weight of ethanol and 5 parts by weight of acetone by agitation, to obtain a disperse system and then, 5 parts by weight of nitrocellulose ("CPN Medium" (trade name) which is commercially available from Dainichi Seika Co., Ltd. in Japan and 20% by weight solution of nitrocellulose) is added to the disperse system. Thereafter, the aerosol can is filled with the disperse system, and 50 parts by weight of dimethyl ether is injected to the aerosol can.

The internal pressure of this aerosol can is 2.5 kg/cm$^2$ and it is recognized that the sprayable properties are good.

In the same manner as the Example 1, the adhesive composition is sprayed on a paper sheet arranged perpendicularly in a position spaced 20 cm apart from the aerosol can, to test affixing properties. As a result, no adhesive transfer phenomenon to the wood free paper occurs when affixing and stripping are repeated for several times.

Comparative Example 10 parts by weight of the microspherical polymers prepared in the Example 1 are put and are dispersed in 100 parts by weight of trichloroethane by agitation. Consequently, each of the polymers swells to decrease flow properties and apparently, to degrade sprayable properties. Even if a spray can or container is forced to be filled with the disperse system obtained along with an aerosol propellant, a nozzle is jammed or a large mass is often sprayed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sprayable adhesive composition prepared by dispersing adhesive microspheres having an average particle diameter of 10 to 100 μm obtained by subjecting a composition containing a (meth)acrylate and a water-soluble monomer copolymerizable with the (meth)acrylate, and an oil-soluble polyfunctional monomer having at least two polymerizable unsaturated groups in a molecule to aqueous suspension polymerization in the presence of an oil-soluble polymerization initiator and a surface-active agent, in a first solvent for maintaining dispersion properties of the adhesive microspheres so as to exhibit sprayable properties, a second solvent for restraining swelling of said adhesive microspheres, and an aerosol propellant, wherein said first solvent is n-hexane or 1,1,1-trichloroethane, and said second solvent is at least one member selected from the group consisting of methanol, ethanol, isopropanol, and n-propanol, said composition being capable of being sprayed from an aerosol can without clogging a nozzle of said can.

2. A sprayable adhesive composition comprising
   acrylic adhesive microspheres having an average particle diameter of 10 to 100 μm polymerized with crosslinking,
   a first solvent for maintaining dispersion properties of the adhesive microspheres, said first solvent being selected from the group consisting of n-hexane and 1,1,1-trichloroethane, in order to exhibit sprayable properties,
   a second solvent for restraining the swelling of said adhesive microspheres selected from the group consisting of methanol, ethanol, isopropanol, n-propanol, and
   an aerosol propellant,
   said composition being capable of being sprayed from an aerosol can without clogging a nozzle of said can.

3. The sprayable adhesive composition according to claim 1, wherein said aerosol propellant is selected from fluorochlorohydrocarbons, a mixed system of propane and butane, and dimethyl ether.

4. The sprayable adhesive composition according to claim 1, which contains 80 to 50% by weight of the first solvent and 50 to 20% by weight of the second solvent.

5. The sprayable adhesive composition according to claim 1, wherein said aerosol-dispersion medium further contains nitrocellulose or denaturated nitrocellulose.

6. The sprayable adhesive composition according to claim 5, which contains said nitrocellulose or denaturated nitrocellulose in the range of not more than 15 parts by weight as a solid content per 100 parts by weight of the adhesive microspheres.

7. The sprayable adhesive composition according to claim 2, wherein said aerosol propellant is at least one member selected from the group consisting of fluorochlorohydrocarbons, a mixed system of propane and a butane, and dimethyl ether.

8. The sprayable adhesive composition according to claim 2, which contains 80 to 50% by weight of the first solvent and 50 to 20% by weight of the second solvent.

9. The sprayable adhesive composition according to claim 2, which further contains nitrocellulose or denaturated nitrocellulose.

10. The sprayable adhesive composition according to claim 9, which contains said nitrocellulose or denaturated nitrocellulose in the range of not more than 15 parts by weight as a solid content per 100 parts by weight of said adhesive microspheres.

* * * * *